Sept. 15, 1970     L. C. WATERMAN     3,528,222
METHOD AND APPARATUS FOR SEPARATING MIXTURES
OF GAS, WATER AND OIL
Filed May 21, 1968     3 Sheets-Sheet 1

INVENTOR
LOGAN C. WATERMAN
BY HIS ATTORNEYS
HARRIS, KIECH, RUSSELL & KERN

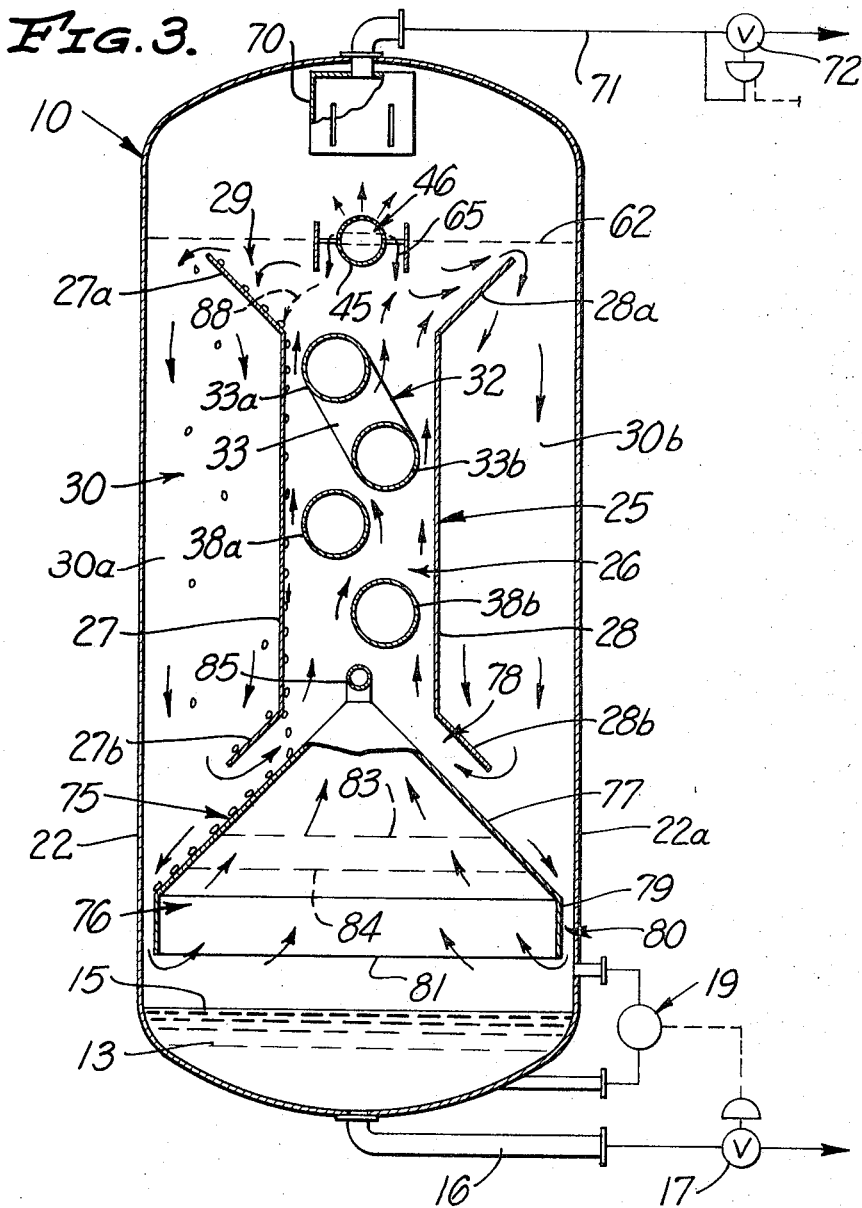
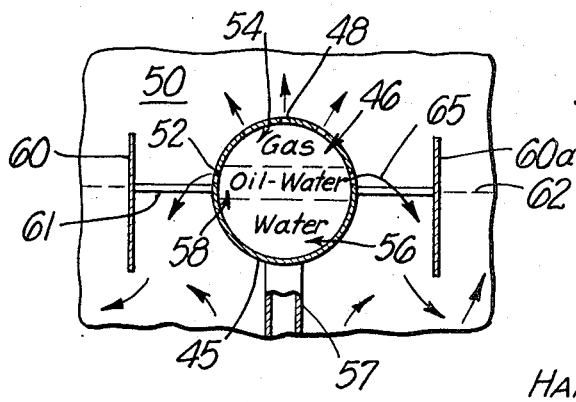

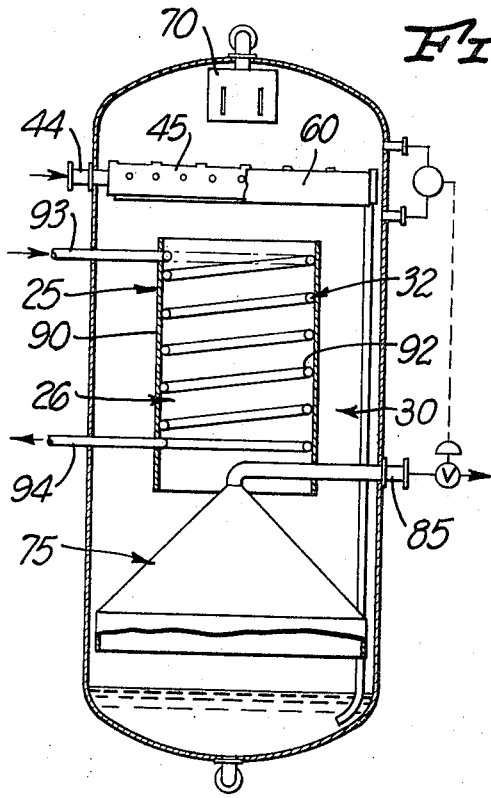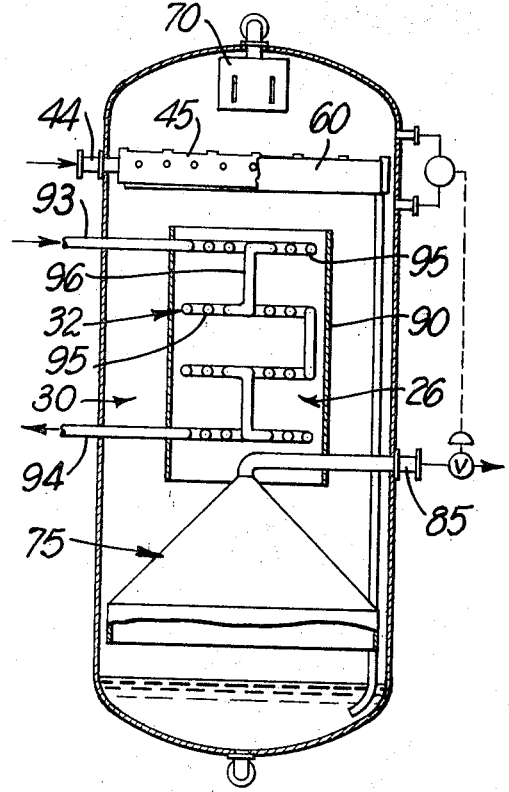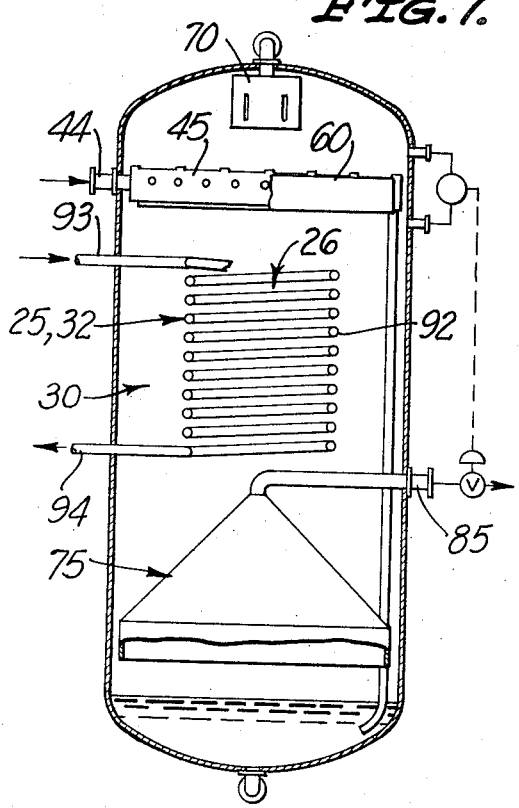

United States Patent Office 3,528,222
Patented Sept. 15, 1970

3,528,222
METHOD AND APPARATUS FOR SEPARATING MIXTURES OF GAS, WATER AND OIL
Logan C. Waterman, Houston, Tex., assignor to Petrolite Corporation, St. Louis, Mo., a corporation of Delaware
Filed May 21, 1968, Ser. No. 730,777
Int. Cl. B01d 19/00
U.S. Cl. 55—175                          26 Claims

ABSTRACT OF THE DISCLOSURE

A separator for oil-water or other mixtures in which a liquid is thermally circulated in a closed path, the mixture is supplied to such circulation at one position and a partially-treated mixture is withdrawn from the circulation at another position and separated in a zone shielded from the circulation. Gas-containing mixtures are subjected to an initial gas separation step before joining the circulation.

Figure 1:
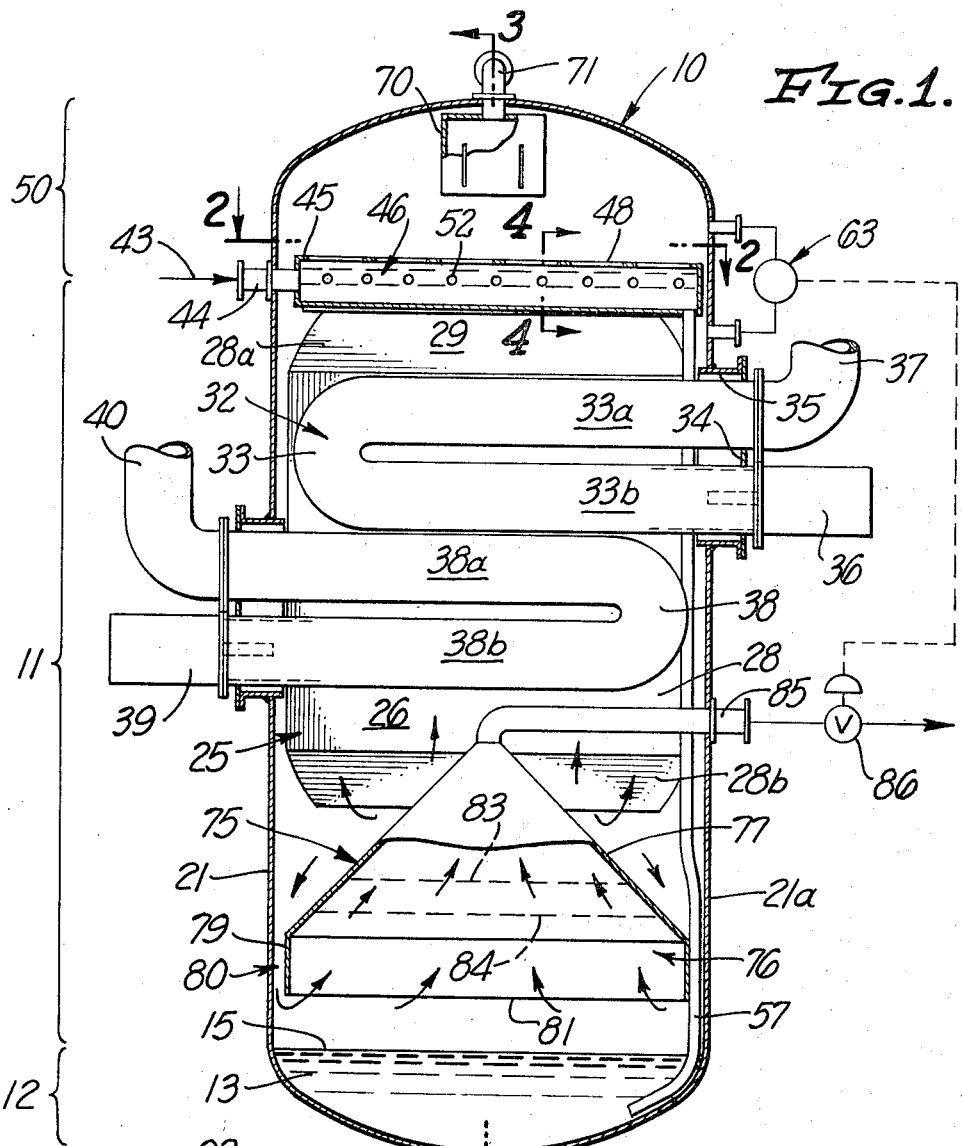

My invention relates to the separation of mixtures of immiscible liquids and will be exemplified as applied to the separation of oil-water mixtures sometimes containing entrained gases. As the term is herein used, mixtures include emulsions or dispersions. The invention will be specifically exemplified as applied to the separation of the constituents of crude oils but it should be understood that it is useful in the separation of the constituents of other mixtures particularly if they contain oil and this oil is the continuous-phase materials.

It is known that heat applied to such mixtures facilitates their separation. The present invention relates to those separators in which heat is applied in a heating zone and ultimate separation of the constituents takes place in another zone. One of its objectives is to provide for the efficient heating and initial treatment of the mixture preparatory to ultimate separation.

It is also known that controlled movement within a body of an oil-water mixture can induce coalescence of dispersed droplets of water, as by bringing them together in such a way that they coalesce or join and form a larger water mass that is more easily separable from the oil upon standing. For example, it is known that "rolling" a body of crude oil-water emulsion in a tank by introducing gas or air thereinto can induce such coalescence that the larger droplets will settle out when later allowed to stand quiescent in the tank. Heating of the emultion and/or mixing a chemical demulsifying agent therewith will usually facilitate the coalescence and later separation of the water. It is an object of the present invention to provide a method and apparatus in which coalescence is achieved dynamically by thermal circulations induced during heating. Preliminary addition of a chemical demulsifying agent is often helpful. It is not essential to introduce gas or air into the body of oil-water mixture to induce movement therein but the invention does not exclude the introduction of such gas or air into the mixture that is being thermally circulated to act as an aid to coalescence or to aid the circulation.

It is a general object of the invention to establish a thermally-induced circulation of liquid in a closed path within a separator vessel. Another objective is to heat the liquid in an open-ended passage formed in a liquid zone of the vessel by an upright baffle means, the heat inducing a thermal circulation of the liquid. Such an upright baffle means may be formed by plates, an upright cylindrical member or even by the heater itself, as will be explained. The circulation is preferably in two or more closed ring-like paths around opposite portions or around all portions of the baffle means. It is an object of the invention to provide such circulations; also to control the liquid to rise in the open-ended passage and drop in a circulation space between the baffle means and the vessel. This reduces heat losses because the heater and the hottest oil are spaced from the outer wall of the vessel. Other advantageous results are that the cooling adjacent the vessel wall aids the circulation, there is less fouling of the heater and higher combustion rates are made possible if a combustion type heater is employed, all while minimizing the vaporization of light fractions from the oil.

A further object of the invention is to blend the incoming oil-water mixture with a circulating and already-heated liquid, usually a partially-treated oil-water mixture. An important objective is to supply the incoming mixture to the circulating liquid at one position or level in the closed circulation path and to withdraw a partially-treated mixture from the closed circulation path at another position or level.

Another object is to move the partially-treated mixture into a separation chamber where conditions are quiescent and conducive to gravitational separation of the oil and water. A further and important object is to dispose this separation chamber in the lower part of the vessel so that ultimate separation takes place in that portion of the vessel that is subjected to the highest hydrostatic pressure and where temperatures are the lowest. Both high pressure and low temperature tend to minimize evolution of residul gas in the separating chamber—a desirable result because any such gas evolution from the mixture impedes the desired separation of the water and oil by gravitational effects. Still further objects reside in the unique positional and structural relationships of the walls forming the separation chamber and the walls of the baffle means.

Still another object is to subject the incoming oil-water mixture to a gas-separation step before introducing it into the circulating liquid; also to provide for such initial gas separation in a large substantially-horizontal large-diameter delivery pipe traversing the vessel. The latter feature is useful irrespective of whether or not the mixture is discharged into a liquid body that is circulating. The interior of such a delivery pipe provides a space for initial separation of entrained gases; also for separation of some free water of the mixture that may be present in relatively large drops which rapidly settle or become larger during flow in the delivery pipe. A further objective is to flow the mixture longitudinally along such a large-diameter delivery pipe while removing the separated gas through openings of the pipe at or near the top thereof and removing the liquid constituents through pipe openings that are at a lower level.

Further objects and advantages of the invention will be evident to those skilled in the art from the following description of an exemplary embodiment of the invention.

Figure 2:
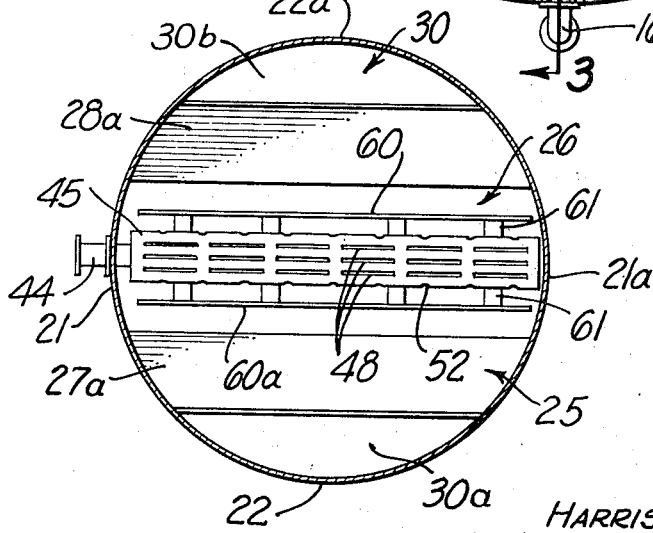

Referring to the drawings, FIG. 1 is a vertical sectional view of the preferred embodiment of the invention while FIGS. 2, 3, and 4 are sectional views taken along corresponding lines of FIG. 1. FIGS. 5, 6, and 7 are sectional views of alternative embodiments.

The separator of the invention has been illustrated and will be exemplified as a gas-water-oil separator applied to the separation of mixtures such as crude oil emulsions pumped from wells. Usually some gas is entrained therein and additional gas in solution in the oil may be liberated as a result of heating or reduction in pressure. The water in such crude oils may be emulsified therein although many of these crude oils contain free water which will separate rather rapidly as compared with the usually-smaller emulsified water droplets. The invention separates the gases and the water while minimizing vaporization of light fractions from the oil.

As best shown in FIGS. 1 and 3 the invention includes a vessel 10 providing therein a liquid zone 11 above a water zone 12 in which collects a body of separated water 13. There is an interfacial zone 15 at a level adjacent the top of the body 13. Above this interfacial zone the liquid is oil-continuous. Below this interfacial zone the liquid is water-continuous and usually comprises with little or no residual oil droplets suspended therein. The effluent water is withdrawn from the body 13 through a pipe 16. Any conventional level-control means 19, responsive to any rise and fall of the interfacial zone 15, can be operatively connected to the valve 17 to maintain the interfacial zone at a constant level.

The vessel 10 should be of substantial height, e.g. a height of at least about four feet and preferably eight feet or more. Its cross-sectional shape and size are not critical but excellent results are obtained by use of a tall cylindrical vessel as illustrated. Two opposed side walls of the vessel are indicated in FIG. 1 by the numerals 21 and 21a while two other opposed side walls are indicated at 22 and 22a, see FIG. 3.

Within the liquid zone 11 of the vessel is an upright baffle means 25 providing an upright internal passage 26 having upper and lower ends opening on the liquid zone 11 at different levels. This baffle means may be variously shaped but is illustrated and exemplified in FIGS. 1 and 3 as including a pair of spaced upright baffles 27 and 28 traversing most or all of the space between the opposed side walls 21 and 21a so that the upright passage 26 is bounded laterally by the two baffles and by these side walls. In the illustrated embodiment, the central portion of each of the baffles 27, 28 is planar and of substantial height. The tops of the baffles diverge upwardly because of angled portions 27a and 28a to form a trough-like space 29 traversing the vessel. Similarly the lower portions of the baffles diverge downwardly as the result of angled portions 27b and 28b which form a skirt at the bottom of the baffle means. The angled portions 27a, 28a and if desired the angled portions 27b, 28b extend to the vessel walls and may be welded or otherwise attached thereto to support the baffle means. The central portions of the baffles 27, 28 will likewise desirably extend to the vessel walls, as shown in FIGS. 1 and 2.

Between the baffles 27, 28 and the opposed side walls 22, 22a of the vessel 10 is an upright circulation space indicated generally by the numeral 30. In this embodiment the circulation space is made up of portions 30a and 30b respectively between the baffles and the corresponding side walls of the vessel. The baffle means 25 is submerged in the liquid in the liquid zone 11 so that the upright passage 26 and the upright circulation space 30 are filled with this liquid.

The invention provides thermal means for establishing a closed circulation around the baffle means with the liquid flowing upward in the internal passage 26 and downward in the upright circulation space 30. In the illustrated embodiment two ring-like circulations will be established, respectively around the baffles 27 and 28. A heater 32 is adapted to heat the liquid in the internal passage 26 and induce the closed circulations.

The heater 32 may take various forms some of which will be later described. As exemplified in FIGS. 1 and 3 the heater is a combustion type heater and includes a U-shaped heater tube 33 with its legs 33a and 33b extending from or through the side wall 21a. In this connection these legs are shown as extending through corresponding openings in a plate 34 closing a flanged collar 35 welded to the vessel wall 21a. The bight of the U-shaped heater tube 33 connects the legs and lies adjacent the side wall 21. Preferably the axes of the legs 33a, 33b lie in an inclined plane to dispose these axes on opposite sides of the midplane of the upright passage 26. Otherwise stated, these legs are in offset relation with reference to the stream of liquid which rises in the passage. This offset relation and the disposing of the legs 33a, 33b at different elevations are conducive to maximum heat transfer between the liquid and the products of combustion which are produced in the leg 33b by a burner 36 and that exit from the leg 33a through a stack 37.

For maximum heating of the oil without local overheating that would tend to liberate the lighter fractions of the oil, the heater 32 preferably includes also a second U-shaped heater tube 38 with its legs 38a, 38b extending through the opposite side wall 21 of the vessel and with a second burner 39 forming products of combustion which exit through the leg 38a to a second stack 40. The axes of the legs 38a and 38b are likewise in an inclined plane, preferably parallel to the corresponding plane of the heater tube 33. Likewise the legs 38a and 38b are preferably at different levels and offset laterally from each other. Either one or two of the U-shaped heater tubes can be employed as the heater 32 but in the preferred practice of the invention the heater of whatever form is disposed largely in the upper half of the vessel.

The mixture to be separated, e.g. a crude oil emulsion as produced or as modified by a chemical demulsifying agent added thereto as suggested by the arrow 43, is delivered to a vessel-traversing pipe 44 which feeds the mixture into a large-diameter conduit 45 closed at its far end and providing therewithin a gas-separating space 46. This large-diameter conduit 45 is preferably positioned near the top of the trough-like space 29. Openings 48 through an upper sector of the conduit 45 conduct separated gas from the space 46 to a gas zone 50 in the top of the vessel above the liquid zone 11. These openings 48 are preferably elongated slots aligned longitudinally of the conduit in one, two or three parallel rows, see FIG. 2. The large-diameter conduit 45 also provides other openings 52 distributed along the length thereof and disposed on at least one of the two opposite sides of the conduit at a level near the horizontal midplane of the conduit. These openings serve to discharge the liquid components, typically a mixture of oil and water, that remain after separation of gas and some water in the space 46.

The incoming gas-water-oil mixture tends to separate during flow longitudinally along the large-diameter conduit 45. As best shown in FIG. 4, the gas separates and occupies a gas space 54 in the upper interior of the conduit with the gas exiting through the openings 48 into the gas zone 50 of the vessel. If the incoming mixture contains substantial amounts of free or readily-separable water, this water drops to the lower interior of the large-diameter conduit 45 and flows along a water space 56 to the far end of the conduit where it discharges into an upright pipe 57 leading downward to and opening in the the body of water 13. To facilitate this flow of water in the large-diameter conduit 45, the conduit may be disposed at a slight angle from the horizonal, sloping downward from the entrance end to the opposed closed end as shown in FIG. 1. The remaining oil-water mixture will flow longitudinally of the large-diameter conduit 45 in a residual-mixture space 58 (FIG. 4) and will discharge laterally through the openings 52.

The lateral streams of the mixture discharging through the openings 52 are preferably deflected by flow-control baffles 60 and 60a paralleling the sides of the large conduit and disposed in the path of flow of the mixture discharging from these openings. Brackets 61 extend laterally outward from the large-diameter conduit 45 to space the flow-control baffles 60, 60a laterally from the sides of the large conduit.

There will be a gas-liquid interface 62 in the vessel at the junction of the liquid zone 11 and the gas zone 50. This interface is maintained at approximately the level shown in FIGS. 3 and 4 by use of a level-control device 63 best shown in FIG. 1 and functioning as will later be described. The level of the interface 62 is at or slightly below the level of the openings 52. The flow-control baffles 60, 60a deflect the oil-water mixture from the openings 52 to flow downward as indicated by the arrows 65 of FIGS. 3 and 4. This oil-water mixture is thus discharged into the heated liquid at a position near the top of the circulation path. It mingles with the liquid and flows outward and over the tops of the baffles 27, 28 as shown by the arrows in FIG. 3. Because the entering mixture is at a lower temperature than the heated liquid with which it mingles and because this liquid has been heated in the central portion of the vessel, the blended materials flowing downward in the upright circulation space 30 are cool relative to the hot liquid rising in the upright internal passage 26. This minimizes heat losses to the atmosphere through the side walls of the vessel 10.

The flow-control baffles 60, 60a preferably traverse the gas-liquid interface 62. Their upper edges may terminate above, opposite or slightly below the openings 48 discharging the separated gas into the gas zone 50.

The gas exits from the gas zone 50 through a conventional device 70 that separates therefrom any entrained particles of liquid that might be carried therewith. The dry gas discharges through a line 71 equipped with a diaphragm-controlled valve 72 that controls the pressure within the vessel 10, which pressure may be atmospheric, superatmospheric or even subatmospheric if one wishes to strip gas from the oil.

As the oil-water mixture from the large-diameter conduit 45 blends with the up-flowing hotter liquid and moves downward in the upright circulation space 30 some of the water droplets coalesce and settle from the circulation at the bottom of the circulation path before the liquid turns upward to rise again and be heated in the upright internal passage 26. Likewise however some of the oil-water mixture will be continuously withdrawn from the lower portion of the circulation path. Its final separation should be at a position removed from the circulation path.

For greatest economy this final separation of the oil and water should be in a separation chamber positioned in a lower section of the vessel 10 and shielded from the thermally-induced circulation in the upper portion of the vessel. The preferred arrangement is shown in FIGS. 1 and 3 and includes a final separator unit 75 providing a separation chamber 76 that opens downwardly toward the body of separated water 13. As shown, the separator unit 75 provides an upwardly converging upper wall 77 spaced from the lower skirt-forming diverging portions 27b, 28b of the baffles to provide a flow space 78 therebetween for return upward flow of liquid into the upright internal passage 26. At the bottom of the converging upper wall 77 is a skirt 79 forming the side walls of the separation chamber and separated from the side walls of the vessel 10 to provide therebetween a passage 80 for delivering the partially-treated mixture downward and thence upward into the bottom of the separation chamber 76 around a lower lip 81 of the skirt 79, this lip being above the interfacial zone 15.

The walls of the final separator unit 75 shield the separation chamber 76 from the thermally-induced circulations thereabove and maintain quiescent conditions in the separation chamber 76 conducive to final separation of the water from the oil during this upward flow in the chamber. Usually no aid to this separation is required but if desired any known aid to coalescence may be installed at any position in the chamber 76, as for example between the dotted lines 83 and 84. Such a coalescing aid may be a layer of excelsior or any other devices or apparatus known in the art to aid in the coalescence and separation of the dispersed water that is present in the oil rising therethrough. The upper wall 77 is shown as conical so that the treated oil rises to the apex or to the upper interior of the separation chamber 76 and exits laterally from the vessel through a pipe 85 with the flow being controlled by a valve 86 that is in turn operatively connected to the flow-control device 63 which controls the oil flow to maintain the gas-liquid interface 62 at a constant level.

It will be observed that water has an opportunity to settle from the oil in all portions of the liquid zone 11 of the vessel. Separation of much or all of the free water takes place in the large-diameter conduit 45 as previously described, this separated water being delivered directly to the body of water 13 through the upright pipe 57. Even during the upward and outward flow of the liquid in the trough-like space 29 some water droplets will settle to the angled portions 27a and 28a of the baffles as suggested in the left half of FIG. 3. These water droplets will tend to cling to the baffles and flow downwardly therealong against the rising stream in the upright internal passage 26, dropping ultimately to the top surface of the converging upward wall 77 and flowing downward therealong as shown. Some of the more easily separated water exiting through the openings 52 of the large-diameter conduit 45 appear to join this path, as indicated by the dotted arrow 88 in the left half of FIG. 3.

However a majority of the water droplets will be carried outward and over the top of the baffle means and will be carried with the entraining oil to move into the upright circulation space 30. Here the flow is downward and the tendency for the dispersed water to separate by gravity is not impeded by any counterflow. As a result, the water droplets moving downward in the upright circulation space 30 tend further to coalesce and separate from the circulating stream at the point where a significant portion of the circulating stream turns upward into the flow space 78 for reheating. However a considerable portion of the liquid is withdrawn from the circulation path at this lower position and moves downward in the annular space between the converging upper wall 77 and the vessel and thence into and through the passage 80. This material is of augmented water content but much of the entrained water will readily separate from the oil as the flow turns inward below the lip 81, this water dropping to the body of separated water 13 and leaving a partially-treated mixture which rises in the separation chamber 76 for ultimate treatment and/or separation. It is a feature of the invention that the oil and water of the mixture separating from the circulation path move downward concurrently in the zone around the separator unit 75. Separation of water in a direction countercurrent to the oil flow is thus here avoided.

It will be understood that the separation chamber 76 may be disposed at a position other than in the lower portion of the vessel 10. However this arrangement has been found to be particularly advantageous because the ultimate separation takes place in a quiescent zone where the hydrostatic pressure is a maximum as compared with pressures existing in portions of the vessel at higher levels. Also the separation chamber is then disposed in that portion of the vessel in which the temperature is the lowest. Both of these factors tend to prevent separation of any residual gases in the separation chamber 76 and thereby facilitate the ultimate oil-water separation by maintaining quiescent conditions conducive to the best possible separation during up-flow in the separation chamber. This mode of operation contrasts markedly with separators earlier proposed and that often provide for ultimate separation in a zone of the vessel at the top thereof, being thus a zone of relatively low pressure and often higher temperature where the complete separation afforded by the present invention cannot be obtained. The structural arrangement of the present invention also provides for a separation chamber 76 that is of maximum cross-sectional area within the vessel. At its lower end the separation chamber 76 is only slightly smaller in diameter than the vessel. The passage 80 conducting the mixture downward need be only a narrow space.

It is a feature of the invention that the incoming mixture is blended with heated oil and that the structural arrangement produces a more uniform temperature of the oil throughout the zones where settling takes place as compared with earlier separators. It is also a feature of the invention that some separation of water can take place during downward movement in the circulation space 30 and that the cooling action of the vessel wall aids this separation. It should be noted also that heat is applied to a circulating oil system and that this oil has been largely degassed and to some extent presettled. Heating in this manner permits the use of higher combustion rates and produces less fouling of the heater and minimum vaporization of light fractions from the oil. It will be observed also that the heater and the hottest oil in the system is shielded from the vessel, resulting in reduced heat loss. Finally, it is believed to be unique to provide for initial separation of gas and/or free water in a generally-horizontal laterally-confined space such as is provided by the large-diameter conduit 45.

The invention is not limited to use of a heater and baffle structure constructed as thus far described. FIGS. 5, 6, and 7 show alternative constructions that are also useful and that produce satisfactory results.

Referring to FIG. 5, the general arrangement is substantially as previously described except that the upright baffle means 25 is here a cylindrical baffle 90 open at its upper and lower ends and except that the heater 32 is here a helical pipe coil 92 disposed within the cylindrical baffle receiving steam or hot fluid through a pipe 93 and discharging cooler fluid or condensate through a pipe 94. Steam heating in this manner is particularly advantageous. If desired the top and/or bottom of the cylindrical baffle 90 can be flared to simulate the function of the angled portions 27, 27a, 28 and 28a of FIG. 3. Alternatively these angled portions of the embodiment of FIGS. 1 and 3 may sometimes be omitted to approach the structure shown in FIG. 5.

Flow paths in FIGS. 5, 6, and 7 are substantially the same as described with reference to FIGS. 1 and 3. The large-diameter conduit 45 and the flow-control baffles 60 extend diametrically across the top of the cylindrical baffle 90 and discharge the oil-water mixture in such pattern as to be picked up largely by the heated stream rising and spreading from the top of the upright internal passage 26. Some of the larger and more easily separated water droplets may drop through the rising stream within the cylindrical baffle 90 in a manner previously described.

The structure of FIG. 6 is the same as FIG. 5 except that the heater 32 is here in the form of superimposed pancake coils 95 each of which may be of spiral or other configuration with a plurality of pipe portions in a single horizontal plane but spaced from each other to provide for upward passage of the rising stream. The pancake coils 95 are suitably interconnected as at 96 so that steam or other hot fluid entering at 93 may discharge as condensate or cooler fluid at 94.

The structure of FIG. 7 is essentially the same as FIG. 5 except that the cylindrical baffle 90 is omitted and the turns of the helical pipe coil 92 are spaced somewhat closer so that the helical pipe coil 92 becomes both the heater 32 and the upright baffle means 25. The spacing of the turns is not critical as the liquid in the upright internal passage 26 within the confines of the helix is kept hotter than the liquid in the upright circulation space 30, with the hotter liquid tending to rise almost irrespective of the lateral restraint resulting from the presence of the spaced turns of the helical pipe coil 92 that act here as the upright baffle means 25.

In each of the embodiments of FIGS. 5, 6, and 7 heating by the use of steam is very desirable and economical, particularly if the steam enters at the top of the coil system and the condensate exists from the bottom of the system.

The structural features of the invention have been described with reference to preferred embodiments. It should be understood however that they can be incorporated in the vessels of various shape with the chambers and passages arranged other than as has been illustrated and that various changes and modifications can be made without departing from the spirit of the appended claims.

I claim:
1. A separator for separating mixtures of oil and water, said separator including:
   a vessel providing therewithin a liquid zone containing a body of liquid above a water zone;
   flow-establishing means including means defining and laterally bounding an upright passage in the liquid zone of said vessel and means for heating the body of liquid in said upright passage to effect flow in a closed thermal liquid circuit said flow being upward in said internal passage and downward in an upright circulation space between said passage-bounding means and side walls of said vessel, said upright passage having upper and lower ends opening on said liquid zone and openly communicating with upper and lower portions of said upright circulation space;
   inlet means for continuously delivering to the circulating liquid at one position in the closed circulation path at one level in the vessel the oil-water mixture to be separated, whereby the mixture becomes a part of the liquid circulating in said closed path, and the heating of the mixture and the movement thereof as a result of flow in said closed circulation path produces a partially-treated mixture;
   means for continuously withdrawing from said closed circulation path at another level in the container a partially-treated oil-water mixture;
   walls within the vessel defining a separation chamber in which the oil and water of the partially-treated mixture separate by difference in specific gravity, there being a passage delivering the partially-treated mixture to said separation chamber for separation therein, with said separation chamber disposed adjacent the lower end of said flow establishing means and below said inlet means;
   means for withdrawing separated water from the water zone of said vessel; and
   means for withdrawing oil from the top of said separation chamber.

2. A separator as defined in claim 1 in which said flow-establishing means comprises an upright baffle means laterally bounding said upright passage and a heater in the upright passage thereof.

3. A separator as defined in claim 1 in which said flow-establishing means and said heating means comprises essentially a heating coil in the liquid zone of said vessel, said coil having closely spaced turns extending around a vertical axis with said turns being one above the other and conducting a heating medium supplied to said coil, the spaces between said turns interconnecting the upright passage and the circulation space.

4. A separator as defined in claim 1 in which said separation chamber is a laterally and upwardly confined space in the lower portion of said vessel at a level below and shielded from said closed thermal liquid circuit so located and constructed that the separation in this chamber takes place under a hydrostatic pressure greater than at the level of said closed thermal liquid circuit.

5. A separator as defined in claim 4 in which said inlet means for delivering said oil-water mixture to said circulation path include a gas separating means near the top of said liquid zone receiving an oil-water mixture containing gases, said gas separating means including first passage means delivering separated gas to a gas zone in the top of said vessel and second passage means delivering said oil-water mixture to the upper portion of said closed circulation path.

6. A separator as defined in claim 5 in which said gas-separating means includes a large-diameter conduit near the top of said liquid zone, said conduit having therein a space for gas separation, the upper portion of said conduit having gas openings comprising said first passage means connected directly to delivering separated gas to said gas zone, said conduit having liquid openings distributed along the length thereof at a level below said gas openings, said liquid openings comprising said second passage means delivering said oil-water mixture to the upper portion of said closed circulation path, with the oil-water mixture containing gases introduced into said large-diameter conduit flowing longitudinally therealong during the separation of gases therefrom.

7. A separator as defined in claim 6 including pipe means communicating between the bottom interior of said large-diameter conduit and the water zone of said vessel for conducting to the latter any water separating from said oil-water mixture during flow along said large-diameter conduit.

8. A separator for separating mixtures of oil and water, said separator including:
   a vessel providing therewithin a liquid zone containing a body of liquid above a water zone;
   upright baffle means constructed to define therewithin an upright internal passage in the liquid zone of said vessel with upper and lower ends of such passage opening on said liquid zone at different levels, there being an upright circulation space between said baffle means and the side walls of the vessel with the top and bottom of such upright circulation space openly communicating with the upright internal passage through the open upper and lower ends thereof;
   means for establishing in said liquid zone a closed thermal liquid circuit containing liquid moving in a closed circulation path with the liquid flowing upward in said internal passage of said baffle means and downward in said circulation space;
   inlet means for continuously delivering to the circullating liquid at one position in the closed circulation path at one level in the vessel the oil-water mixture to be separated, whereby the mixture becomes a part of the liquid circulating in said closed path, and the heating of the mixture and the movement thereof as a result of flow in said closed circulation path produces a partially treated mixture:
   means for continuously withdrawing from said closed circulation path at another level in the container a partially-treated oil-water mixture;
   walls within the vessel defining a separation chamber in which the oil and water of the partially-treated mixture separate by difference in specific gravity, there being a passage delivering the partially-treated mixture to said separation chamber for separation therein, with said separation chamber positioned below said baffle and below said inlet means;
   means for withdrawing separated water from the water zone of said vessel; and
   means for withdrawing oil from the top of said separation chamber.

9. A separator as defined in claim 8 in which said separation chamber is coaxial with said upright internal passage and provides an upper wall spaced from the open lower end of the baffle means to provide a flow space therebetween through which moves the liquid in the lower portion of said closed circulation path.

10. A separator as defined in claim 9 in which said separation chamber is open downwardly toward said water zone so that water separating therein from said partially treated mixture drops to a body of water in said water zone, said water-withdrawal means opening on said body of water.

11. A separator as defined in claim 10 in which the walls of said separation chamber include side walls spaced from the side walls of said vessel and providing therebetween said passage delivering the partially-treated mixture to said separation chamber, said passage conducting such partially-treated mixture to the bottom of the downwardly open separation chamber for separation of the oil and water therein during upward flow of the oil and water therein.

12. A separator as defined in claim 9 in which said wall of said separation chamber is an upwardly converging top wall, said oil-withdrawing means including a pipe opening on the space within the upper interior of said top wall.

13. A separator as defined in claim 12 in which said upwardly-converging top wall terminates in a crest disposed within the open lower end of said upright internal passage.

14. A separator as defined in claim 13 in which said baffle means provides a skirt at its lower end, the space between this skirt and the upwardly-converging top wall being said flow space through which moves the liquid in the lower portion of the closed circulation path.

15. A separator as defined in claim 8 in which said means for establishing said closed thermal liquid circuit includes a heater in said upright internal passage in heat-transfer relation with the upward-flowing liquid therein.

16. A separator as defined in claim 15 in which said heater includes two U-shaped heater tubes at different levels in said upright internal passage, each U-shaped heater-tube having two legs also at different levels in said upright internal passage.

17. A separator as defined in claim 15 in which said heater is a steam coil in said upright internal passage, said coil having upper and lower portions, and means for delivering steam to the upper portion of said coil and means for withdrawing condensate from the lower portion thereof.

18. A separator for separating mixtures of oil and water, said separator including:
   a vessel providing therewithin a liquid zone containing a body of liquid above a water zone, said vessel having opposed side walls;
   a pair of spaced upright baffles traversing the space between said opposed side walls and providing an upright internal passage with upper and lower ends of such passage opening on said liquid zone at different levels, said upright passage being bounded laterally by said baffles and by said opposed side walls, there being an upright circulation space between said baffles and other opposed side walls of the vessel with the top and bottom of such upright circulation space openly communicating with the upright internal passage through the open upper and lower ends thereof;
   means for establishing in said liquid zone a closed thermal liquid circuit having liquid moving in a closed circulation path with the liquid flowing upward in said internal passage and downward in said circulation space, said means including a heater in said upright internal passage in heat-transfer relation with the upward-flowing liquid therein;
   inlet means for continuously delivering to the liquid circuit near the top of said closed circulation path the oil-water mixture to be separated, whereby the mixture becomes a part of the liquid circulating in said closed path, and the heating of the mixture and the movement thereof as the result of flow in said closed circulation path produces a partially treated mixture;
   means for continuously withdrawing from a lower portion of said closed circulation path a partially-treated oil-water mixture;
   means for separating the oil and the water of said partially-treated mixture to produce a body of treated oil, with said means for separating positioned below said baffles and below said inlet means, the water separating from said mixture in said vessel producing a body of separated water in the bottom of the vessel;
   means for withdrawing separated water from said body of water; and
   means for withdrawing treated oil from said separating means.

19. A separator as defined in claim 18 in which said oil-water mixture to be treated contains a gas, and including means in said vessel for separating at least a portion of said gas from said oil-water mixture before delivery thereof to the top of said closed circulation path, said gas-separating means including a large-diameter conduit extending between said side walls of said vessel near the top of said baffles, said conduit providing therewithin a space for gas separation, the upper portion of said large-diameter conduit having gas openings through which gas separating from the oil-water mixture in said conduit rises to the top of said vessel, said large-diameter conduit having liquid openings distributed along the length thereof at a level below said gas openings for discharging mixed oil and water to the top of said circulation path.

20. A separator as defined in claim 19 in which said liquid openings of said large conduit are at the sides thereof, and including flow-control baffles paralleling the sides of said conduit and spaced therefrom in the path of flow of the mixed oil and water discharging through said liquid openings.

21. A separator as defined in claim 19 in which the tops of said upright baffles diverge to form a trough-like space extending transversely of the vessel in the direction parallel to the longitudinal axes of said large-diameter conduit, such large conduit being at a position near the top of said trough-like space.

22. A separator as defined in claim 18 in which said heater includes a U-shaped heater tube with its legs extending from one side wall of said vessel toward the opposed side wall and with a bight connecting said legs adjacent said opposed side wall, said legs being one above the other and being displaced with their axes vertically disaligned.

23. A separator as defined in claim 22 in which the axes of said legs lie in an inclined plane, and including a second U-shaped heater tube with its bight adjacent said one side wall and with the axes of its legs in a plane parallel to but spaced vertically from said inclined plane.

24. In apparatus for the separation of oil-water-gas mixtures in a vessel having a gas zone in the upper interior, a water zone in the lower interior and a liquid zone between the gas and water zones, said vessel having means for withdrawing gas and water from the respective zones and means for withdrawing from the vessel oil separated from the oil-water-gas mixture therein:

a new and improved gas separator for positioning near the junction of said gas and liquid zone to which a stream of said oil-water-gas mixture is delivered, said gas separator including:

a large-diameter conduit traversing said vessel at a level near the junction of said gas and liquid zones, said large conduit providing therewithin a gas-separating space and openings through the upper portion of said large conduit for delivering separated gas to said gas zone of said vessel, said large-diameter conduit providing other openings distributed along the length thereof and disposed on at least one of two opposite sides thereof at a level below said first-named openings for delivering to said liquid zone for separation therein the oil and water from which said gas has separated.

25. A combination as defined in claim 24 in which there is a plurality of such other openings on each of said opposed sides of said large-diameter conduit, there being also two flow-control baffles paralleling the sides of said large conduit and in the path of flow of the oil and water discharging from said other openings, said flow-control baffles being spaced laterally from the sides of said large conduit.

26. A combination as defined in claim 25 in which said flow-control baffles are upright and extend parallel to the sides of said large conduit substantially throughout the length thereof, each of said flow-control baffles being of a height approximately the height of said large conduit.

References Cited

UNITED STATES PATENTS

| | | | |
|---|---|---|---|
| 2,181,685 | 11/1939 | Walker | 55—175 X |
| 2,449,738 | 9/1948 | Dake et al. | 210—187 |
| 2,478,144 | 8/1949 | Waugh | 210—187 X |
| 2,521,859 | 9/1950 | Lyne | 55—45 |
| 2,706,531 | 4/1955 | Lovelady et al. | 55—174 |
| 2,713,919 | 7/1955 | Walker et al. | 55—174 X |

FOREIGN PATENTS

| | | |
|---|---|---|
| 237,738 | 8/1925 | Great Britain. |

REUBEN FRIEDMAN, Primary Examiner

R. W. BURKS, Assistant Examiner

UNITED STATES PATENT OFFICE
CERTIFICATE OF CORRECTION

Patent No. 3,528,222　　　　　　　　　Dated September 15, 1970

Inventor(s) LOGAN C. WATERMAN

It is certified that error appears in the above-identified patent and that said Letters Patent are hereby corrected as shown below:

Column 1: line 31, "materials" should read --material--.
Column 2: lines 26-27, "residul" should read --residual--.
Column 3: lines 5-6, "comprises with" should read
　　　　　　--comprises water with--.
Column 5: line 16, "thereform" should read --therefrom--.
Column 9: line 38, the colon should be a semicolon. (Claim 8);
　　　　　　lines 74-75, "said wall" should read
　　　　　　--said upper wall--. (Claim 12).
Column 11: line 43, the colon should be a comma. (Claim 24).

SIGNED AND
SEALED
JAN 5 1971

(SEAL)
Attest:

Edward M. Fletcher, Jr.
Attesting Officer

WILLIAM E. SCHUYLER, JR.
Commissioner of Patents